United States Patent [19]

Krumme

[11] Patent Number: 4,717,814
[45] Date of Patent: Jan. 5, 1988

[54] SLOTTED AUTOREGULATING HEATER

[75] Inventor: John F. Krumme, Woodside, Calif.

[73] Assignee: Metcal, Inc., Menlo Park, Calif.

[21] Appl. No.: 586,711

[22] Filed: Mar. 6, 1984

Related U.S. Application Data

[63] Continuation-in-part of Ser. No. 507,919, Jun. 27, 1983, abandoned.

[51] Int. Cl.4 ............................................. H05B 3/58
[52] U.S. Cl. .................................... 219/553; 219/549; 219/10.77
[58] Field of Search .......... 219/10.41, 10.43, 10.49 R, 219/10.51, 10.53, 10.71, 10.75, 10.77, 10.79, 10.81, 229, 233, 241, 300, 301, 535, 553, 549; 128/1.3, 303.1, 303.13, 303.14; 29/611; 30/140; 174/40 R, 106 R, 126 CP

[56] References Cited

U.S. PATENT DOCUMENTS

| | | | |
|---|---|---|---|
| 1,931,607 | 10/1933 | Halasz | 219/10.49 |
| 1,975,436 | 10/1934 | Sorrel et al. | 219/10.49 X |
| 1,975,437 | 10/1934 | Sorrel | 219/10.49 X |
| 1,975,438 | 10/1934 | Sorrel | 210/10.49 |
| 3,197,829 | 8/1965 | Caveney et al. | 24/16 |
| 3,446,909 | 5/1969 | Kahn | 174/71 |
| 3,482,080 | 12/1969 | Kassen | 219/535 |
| 3,632,976 | 1/1972 | Ando | 219/301 |
| 3,975,617 | 8/1976 | Othmer | 219/300 |
| 3,975,819 | 8/1976 | Ando | 219/10.51 X |
| 4,091,813 | 5/1978 | Shaw et al. | 128/303.14 |
| 4,110,599 | 8/1978 | Offenmann | 219/301 |
| 4,185,632 | 1/1980 | Shaw | 128/303.1 |
| 4,256,945 | 3/1981 | Carter et al. | 219/10.75 |
| 4,303,826 | 12/1981 | Ando | 219/301 |

FOREIGN PATENT DOCUMENTS

| | | |
|---|---|---|
| 00263 | 1/1985 | European Pat. Off. |
| 2056350 | 5/1971 | France |
| 386586 | 4/1965 | Switzerland |

*Primary Examiner*—C. L. Albritton
*Attorney, Agent, or Firm*—Hall, Myers & Rose

[57] ABSTRACT

Designation of specific heating zones and increase in minimum resistance relative to prior heaters of the type to which the present invention pertains is achieved, together with flexibility or bendability, if desired, by slotting the outer conductor of the heater. Additional flexibility is also achieved by confining the high mu material only to those regions of the device where heating is desired, the unslotted regions.

15 Claims, 8 Drawing Figures

SLOTTED AUTOREGULATING HEATER

RELATED APPLICATIONS

This application is related to application Ser. No. 543,443, filed Oct. 19, 1983, is a continuation-in-part of application Ser. No. 430,317, filed Sept. 30, 1982, now abandoned, entitled AUTOREGULATING ELECTRICALLY SHIELDED HEATER, Inventor John F. Krumme; application Ser. No. 445,862, filed Dec. 1, 1982, entitled IMPROVED AUTOREGULATING HEATER, Inventor John F. Krumme; and application Ser. No. 586,721, filed on concurrent date herewith, entitled FLEXIBLE AUTOREGULATING HEATER WITH A LATCHING MECHANISM which is a continuation-in-part of application Ser. No. 507,919 abandoned, filed June 27, 1983. The subject matters of these applications are incorporated herein by reference.

TECHNICAL FIELD

The present invention relates to autoregulating Curie temperature heaters and more particularly to autoregulating Curie temperature heaters in which control of zones of heating and at least partial control of resistance is provided by slotting the outer conductor of the device which technique may also be employed to lend bendability to a restricted region as well as flexibility to the entire heater or specific regions thereof.

BACKGROUND ART

In the U.S. Pat. No. 4,256,945 of Carter and Krumme, there is described an autoregulating electric heater having a laminated structure; one lamina of which has high magnetic permeability and high resistance and another lamina of which is non-magnetic and has a low resistance (such as copper) in electrical contact and, therefore, thermal contact with the first lamina. This structure is adapted to be connected across a constant current, a.c. source such that the layers are in a sense in parallel across the source.

Due to skin effect, the current is initially confined to the high magnetic permeability, high resistance layer so that $P = KR_1$, where P is power, K is $I^2$ which is a constant, and R is the effective resistance of the permeable material at high current concentrations. The dissipation of power heats the layer until it approaches its Curie temperature. The permeability of the lamina decreases towards the level of the second layer, copper for instance, at about its Curie temperature. The current is no longer confined to the high resistivity first lamina by the magnetic properties of the first lamina, and spreads into the copper layer; the resistance to the current drops materially, the power consumed, $P = KR_2$ where $R_2 << R_1$ is greatly reduced and the heating effect is reduced to a level that maintains the device at or near the Curie temperature. The device thus thermally autoregulates over a narrow temperature range about the Curie temperature.

The current source employed in the aforesaid patent is typically a high frequency source, for instance, 8 to 20 MHz to insure that the current is confined to the thin, high resistivity, magnetic layer until the Curie temperature of the magnetic material is attained. Specifically, the maximum regulation is achieved when the thickness of the magnetic layer is of the order of one skin depth at the frequency of operation. Under these circumstances, the maximum change in effective resistance of the structure is achieved at or about the Curie temperature. This fact can be demonstrated by reference to the equation for the skin depth in a monolithic, i.e., non-laminar magnetic structure:

$$S.D. = 5030\sqrt{\frac{\rho}{\mu f}} \text{ cm,}$$

where $\rho$ is the resistivity of the material in ohm-cms, $\mu$ is the relative magnetic permeability and f is frequency of the current. The field falls off in accordance with $e^{-x}$ where x is thickness/skin depth. Accordingly, in a monolithic structure, by calculation, 63.2% of the current is confined to one skin depth in the high mu material. In the region of the Curie temperature, where $\mu=1$, the current spreads into a region $$S.D. = 5030\sqrt{\frac{\rho}{\mu f}} \text{ cm.}$$

If mu was originally equal to 200 (200–1000 being common), the skin depth in the region as the Curie temperature increases by the square root of 200; i.e., the skin depth in the monolithic structure is now 14.14 times greater than with $\mu=200$.

The same type of reasonihg concerning the skin effect may be applied to the two layer laminar structure in the aforesaid patent. Below the Curie temperature, the majority of the current flows in the magnetic layer when the thickness of this layer is nominally one skin depth. In the region of the Curie temperature, the majority of the current now flows in the copper and the resistance drops dramatically. If the thickness of this high mu material were greater than two skin depths, the percentage change of current flowing in the high conductivity copper would be less and the resistivity change would not be as dramatic. Similarly, if the thickness of the high mu material were materially less than one skin depth, the percentage of current flowing in the high resistivity material at a temperature less than the Curie temperature would be less so that the change of resistance at the Curie temperature would again not be as dramatic. The region of 1.0 to perhaps 1.8 skin depths of high mu material is preferred.

An exact relationship for the two layer case is quite complex. The basic mathematical formulas for surface impedance from which expressions can be obtained for the ratio of the maximum resistance, $R_{max}$, below the Curie temperature, to the minimum resistance, $R_{min}$, above the Curie temperature, are given in Section 5.19, pp. 298–303 of the standard reference, "Fields and Waves in Communications Electronics", 3rd Edition, by S. Ramo, J. R. Winnery, and T. VanDuzer, published by John Wiley and Sons, New York, 1965. Although the theory described in the above reference is precise only for the case of flat layers, it is still accurate enough for all practical applications in which the skin depth is substantially less than the radius of curvature.

Difficulty may arise in such devices when the Curie temperature is achieved due to spread of the current and/or magnetic flux into adjacent regions outside of the device, particularly if the device is located close to sensitive electrical components.

In copending patent application of Carter and Krumme, Ser. No. 243,777, filed Mar. 16, 1981, a continuation-in-part application of the application from which the aforesaid patent matured, there is described a mechanism for preventing the high frequency field generated in the heated device from radiating into the regions adjacent the device. This effect is accomplished by insuring that the copper or other material of high conductivity is sufficiently thick, several skin depths at the frequency of the source, to prevent such radiation and electrical field activity. This feature is important in many applications of the device such as a soldering iron where electromagnetic fields may induce relatively large currents in sensitive circuit components which may destroy such components.

As indicated above, the magnetic field in a simple, single layer, i.e., monolithic structure, falls off as $e^{-x}$ so that at three skin depths, the field is 4.9% of maximum, at five skin depths, it is 0.67%, and at ten skin depths, the field is 0.005% of maximum. For some uses, thicknesses of three skin depths are satisfactory although at least five are preferred and in some cases ten or more may be required with some highly sensitive devices in the vicinity of large heating currents.

The devices of the patent and aforesaid application are operative for their intended purposes when connected to a suitable supply, but a drawback is the cost of the high frequency power supply. Where only a very low field may be permitted to radiate from the device, the frequency of the source is preferably maintained quite high, for instance, in the megahertz region, to be able to employ copper or other non-magnetic material having reasonable thicknesses.

In accordance with the invention of copending application of John F. Krumme, Ser. No. 543,443, entitled "Autoregulating Electrically Shielded Heater", filed on Oct. 19, 1983, a relatively low frequency constant current source may be employed as a result of fabricating the normally non-magnetic, low resistivity layer from a high permeability, high Curie temperature material. Thus, the device comprises a high permeability, high resistivity first layer adjacent the current return path and a high permeability, preferably low resistivity second layer remote from the return path; the second layer having a higher Curie temperature than the first-mentioned layer.

As used herein, the term "high magnetic permeability" refers to materials having permeabilities greater than paramagnetic materials, i.e., ferromagnetic materials, although permeabilities of 100 or more are preferred for most applications.

The theory of operation underlying the invention of the aforesaid application filed on Sept. 30, 1982, is that by using a high permeability, high Curie temperature material as the low resistivity layer, the skin depth of the current in this second layer is such as to confine the current to quite thin layer even at low frequencies thereby essentially insulating the outer surfaces electrically and magnetically but not thermally with a low resistivity layer of manageable thickness. The second layer is preferably formed of a low resistivity material, but this is not essential.

An example of a device employing two high mu laminae utilizes a layer of Alloy 42 having a resistivity of about 70-80 micro-ohms-cm, a permeability about 200, and a Curie temperature of approximately 300° centigrade. A second layer is formed of carbon steel having a resistivity of about 10 micro-ohms-cm, a permeability of 1000, and a Curie temperature of about 760° centigrade. The skin depths, using a 60 Hz supply are 0.1" for Alloy 42 and 0.025" for carbon steel. An example of a practical 60 Hz heater based on the above may employ a coaxial heater consisting of a 0.25" diameter cylindrical or tubular copper conductor (the "return" conductor), a thin layer (perhaps 0.002 in thickness) of insulation, followed by the temperature sensitive magnetic alloy having a permeability of 400 and a thickness of 0.1", and finally an outer jacket of steel having a permeability of 1000 and a thickness of 0.1". The overall heater diameter would be 0.65". If the heater is used in a situation requiring 5 watts per foot of heater length for, for instance, protection of a liquid against freezing, the total length of the heater is 1000 feet, the resistance of the heater will be 1.96 ohms. The current will be 50 amperes, and the voltage at the generator end will be 140 volts at temperatures somewhat below the Curie temperature of the temperature sensitive magnetic alloy on the inside of the outer pipe. If there were substantial changes in the electrical resistance due to variations of the thermal load, the required voltage must vary in order to maintain constant current. Such a supply provides current at costs considerably less than a constant current supply at 8-20 MHz.

The power regulation ratios (AR) in such a device, 2:1 to 4:1, are not as high as with the device of the patent with a resistivity difference of about 10:1, but the AR difference may be reduced by using materials of higher and lower resistivities for the low Curie temperature and high Curie temperature materials, respectively. Also, a high mu, relatively low resistivity material such as iron or low carbon steel may be employed to further increase the power regulation ratio.

In accordance with the invention of copending patent application Ser. No. 445,862 of John F. Krumme filed on Dec. 1, 1982, autoregulating power ratios of 6:1 to 7:1 are attained while retaining the ability to utilize low frequency supplies without producing unacceptable levels of field radiation.

The objects of the invention are achieved by providing a region of high conductivity at the interface of the two members having high permeability as set forth in the Krumme application, Ser. No. 430,317, filed Sept. 30, 1982, now abandoned in favor of application Ser. No. 543,443.

The material in the interface region may be copper, for instance, or other highly conductive material. The material may appear as a separate layer, a sandwich of magnetic, non-magnetic and magnetic material or may be bonded to the high and/or low Curie temperature, ferromagnetic layers at the interface to provide a low resistivity, interface region.

Typical thicknesses of the sandwich construction at 1 KHz are 0.03" for both the low and high Curie temperature ferromagnetic materials, respectively, and 0.010" for the copper layer.

In operation, as the Curie temperature of the first layer is approached and its permeability rapidly decreases, the current spreads into the copper layer and into the second magnetic layer. The total resistance of the structure, due to the presence of the copper, drops dramatically providing a high autoregulating ratio. Also, most of the current is confined to the copper layer and only a small percentage penetrates into the second magnetic layer. In consequence, this latter layer need be only 3 to 5 skin depths thick to effect virtually complete shielding of the device. Thus, the object of a large autoregulating power ratio in a relatively small device using a low frequency source is achieved. By a low frequency is meant a source in the range of 50 Hz to 10,000 Hz although 50 Hz-8000 Hz is fully adequate.

With autoregulating ratios of 6:1 and 7:1, the heating variations below and above Curie temperature are quite large so that the apparatus may respond rapidly to thermal load variations and thus maintain accurate temperature regulations in a small device operating at low frequency.

The above devices are on the whole, relatively stiff, and heating is uniform throughout the device. In addition, due to the outer conductor being of low or relatively low resistance, it is often costly and usually involves the use of cumbersome matching components to match the heater to the power source.

DISCLOSURE OF INVENTION In accordance with the present invention, designation of specific heating zones and increase in minimum resistance relative to prior heaters of the type to which the present invention pertains is achieved, together with flexibility or bendability, if desired, by slotting the outer conductor of the heater. Additional flexibility is also achieved by confining the high mu material only to those regions of the device where heating is desired, the unslotted regions. The techniques employed also readily lend themselves to defining zones of different temperatures by employing flat strips of high mu material laid end to end along the heater with various of the strips having different Curie temperatures.

In one embodiment of the invention, a flat, elongated return conductor is covered with insulation, a flat strip of high mu, that is, ferromagnetic or other, material exhibiting ferromagnetic properties is disposed along one of the flat elongated surfaces of the return conductor.

The structure may then be covered by a conductive material having transverse, spaced slots formed in the surface remote from the high mu material. The structure is flexible relative to prior structures because of the slots and because the high mu material is a thin layer lying only along one major surface; the surface opposite the slots.

Resistance of the device is greatly increased relative to prior devices of this type because the cross-sectional area of both the high mu material and the outer layer is greatly decreased and thus current density is increased, raising resistance. The cross-sectional area of the outer layer is raised because no current flows in the region of the transverse slots; it is confined by the slots to the region of the high mu material, particularly below Curie temperature.

Regions of and degree of heating may be controlled by various methods. First, flat high mu members of different Curie temperatures may be disposed at different locations along the device, thus establishing different autoregulating temperatures at these different zones.

Further, the slotted surface may be unslotted in some regions permitting the current to be at least partially diverted from the ferromagnetic material in such regions thereby preventing the device from reaching Curie temperature in such region or simply decreasing resistance in that region. Partial reduction in slotting (shorter slots) may be employed to divert sufficient current to increase the time to reach autoregulating temperatures.

The heater may be made such that it depends for autoregulation on simply increasing the cross-sectional area of the ferromagnetic material in which current flows. This approach may be achieved by employing a high mu material of a thickness of three or more (depending upon the type of heater) skin depths at Curie temperature. A heater in accordance with the aforesaid patent may be achieved by having a ferromagnetic material of 1 to 1.8 skin depth below Curie temperature and an outer layer of appropriate thickness. Alternatively, the ferromagnetic material may be one lamina of a high mu and copper laminate. The outer layer can be stainless steel or other material of high stain resistance and/or good thermal conductivity.

The slots in the surface of the outer conductor may also be employed to provide appropriate bend areas where a strap must go around sharp corners.

BEST MODE FOR CARRYING OUT THE INVENTION

Figure 1:
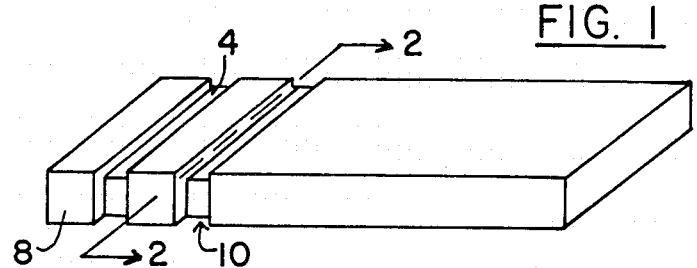
FIG. 1 is a perspective view of one form of heater in accordance with the present invention.
Figure 2:
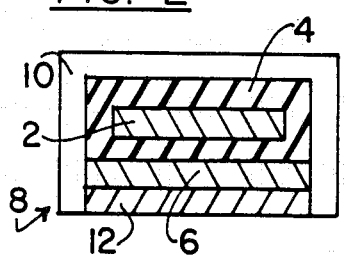
FIG. 2 is a cross-sectional view taken along section line 2—2 of FIG. 1.

Referring now specifically to FIGS. 1 and 2 of the accompanying drawings, there is illustrated one embodiment of a device of the present invention. A current return path is provided by an inner flat elongated conductor 2 usually of copper. The conductor 2 is surrounded by an insulating layer 4 and in one embodiment of the invention a layer 6 of ferromagnetic material is arrayed along the bottom of the structure. An outer covering 8 is also provided to shield the structure, the material of the outer covering, to some extent, being determined by the intended use of the device, as will be discussed subsequently.

The outer covering 8 in accordance with one aspect of the invention is provided with a plurality of closely spaced transverse slots 10 which in the form illustrated extend across the top of the device as illustrated in FIGS. 1 and 2 and down both sides thereof leaving a continuous web 12 of material along the bottom of the device juxtaposed to the ferromagnetic layer 6.

In operation, the current, when applied, can flow only in the bottom region, as viewed in FIGS. 1 and 2, of the outer layer 8. Below Curie temperature, the current is primarily confined to the layer 6 of ferromagnetic material. As the temperature of the heater, and more particularly of the layer 6, approaches Curie temperature, the current in layer 6 spreads and the resistance of the heater drops.

The heater of FIG. 2 may operate in one of two possible modes depending upon the thickness of the layer 6. If the layer 6 is at least five skin depths thick above Curie temperature, then virtually all of the current remains in the layer 6 but is not essentially confined to a skin depth of 1 to 1.8 below Curie temperature. The result is a decrease in resistance due to a material change in current density. Specifically, if the mu of the ferromagnetic material falls from 400 below Curie temperature to 1 above Curie temperature, then skin depth changes by a factor of 20 (the square root of 400). The resistance, however, still remains relatively high since the typical resistivity of ferromagnetic material such as Alloy 42 is about $75\times10^{-6}$ ohm-cm while copper's is about $2\times10^{-6}$ ohm-cm.

If the heater is of the type set forth in the aforesaid patent, then the ferromagnetic layer 6 would be 1 to 1.8 skin depth thick below Curie temperature. Upon approach of the temperature to Curie temperature the current would spread out of the layer 6 into the lower surface 12 of the outer shell 8. If the outer shell is copper, then a material change in resistance occurs, but the resistance is still materially greater than in the prior devices since current flows only in region 12; the slots 10 blocking flow in all other regions.

In the device illustrated, if the layer 6 is at least 5 skin depths thick above Curie temperature, the resistance characteristics of the outer layer become of less concern and various materials such as stainless steel, aluminum, etc., may be employed.

Figure 3:
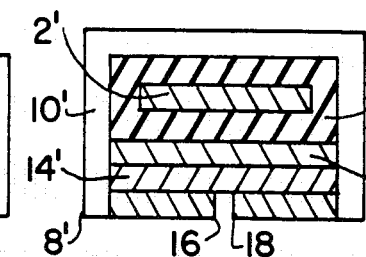
FIG. 3 is a view in cross-section of a modification of the heater of FIG. 2.

An outer layer of any desired material may also be employed with the device of FIG. 3. Referring specifically to FIG. 3 of the accompanying drawings, a device is illustrated that is quite similar to that of FIG. 2 and which operates as the device of the aforesaid patent. Reference numerals with primes in FIG. 3 designate parts that correspond to those of FIG. 2. The only difference between the heater of the two figures resides in the fact that the layer 6' is one lamina of a laminated structure including a second layer 14 which may be copper. Alternatively, the second layer may be a ferromagnetic in accordance with application Ser. No. 543,443 or a second layer of ferromagnetic material in conjunction with a copper layer between the two ferromagnetic layers as taught by application Ser. No. 445,862.

It should be noted that although only two slots 10 are illustrated in FIG. 2, in a standard unit, the entire heater is slotted.

The use of a thick ferromagnetic layer as opposed to the other arrangements is a trade-off between desired resistance, flexibility, desired outer layer and autoregulation ratio but in all events resistance is high relative to prior devices and the strap is quite flexible.

In a typical device of 200 watts a constant current of approximately 7 amps is provided from a source operating at 13.56 MHz and the dimensions of the parts are as follows:

Effective R.F. Resistance at room temperature=4 ohms
Ferromagnetic layer (thick)=0.7 mils.
Ferromagnetic layer (length)=6.2 inches
Width of Ferromagnetic layer=160 mils It will be noticed in FIG. 3, the outer layer 8' is made from a width of material folded about the heater with its elongated edges 16 and 18 brought into virtually abutting engagement. If moisture sealing is required the gap between edges 16 and 18 may be filled with a suitable conductive or non-conductive sealing material.

Figure 4:
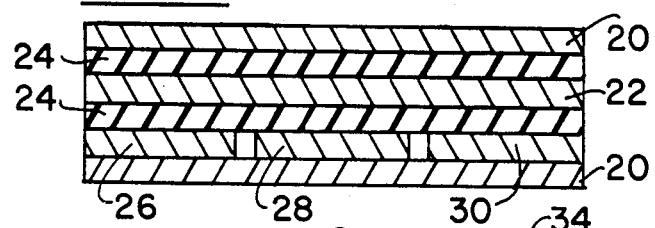
FIG. 4 is a view in cross-section of a multitemperature heater.

Referring now specifically to FIG. 4 of the accompanying drawings, there is illustrated a heater having different temperature zones. The heater comprises an outer layer 20 of conductive material and an inner or current return conductor 22, surrounded by insulation 24. Lying between the lower surface of the insulating material 22 and the lower surface of layer 20, all as viewed in FIG. 4, are three longitudinally extending and spaced strips 26, 28 and 30 of ferromagnetic materials. Each of the strips has a different Curie temperature and thus each strip defines a zone of a different temperature from each other zone or alternatively strips 26 and 30 can be the same with strips 28 defining a different temperature. The strips 26, 28 and 30 may also be arranged side by side.

Figure 5:
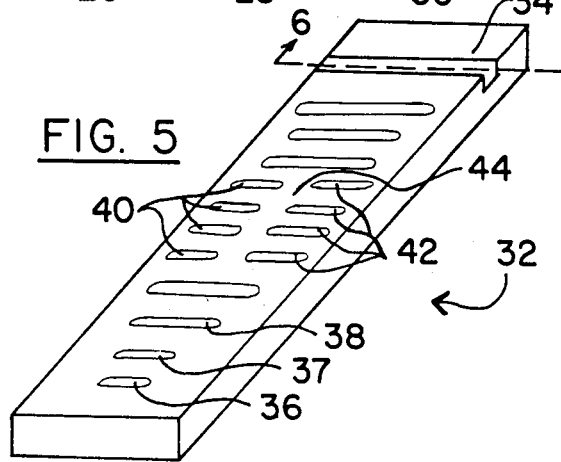
FIG. 5 is a perspective view of a heater employing various arrays of slots to define different heating patterns.

Referring now specifically to FIG. 5 of the accompanying drawings, there is illustrated a heater of the type illustrated in any one of the preceding figures but with a slot pattern that provides various different heat distribution and/or resistance effects.

The heater, generally designated by the reference numeral 32, has various slots for controlling the rate of heating to Curie temperature. The rate of heating of any heater is determined by the relationship between the rate of application of power and the rate of dissipation of heat by all of the three modes of heat dissipation from a surface, convection, conduction, and radiation. Heating up to the Curie temperature is determined by the current density in the ferromagnetic layer. In the present case, if the ferromagnetic material subsists only adjacent the lower surface of the heater, then any current path that is not adjacent the ferromagnetic material reduces the current density therein and reduces the rate of heating. As an example, the slot 34 permits current to flow in at least a part of the right side, as viewed in FIG. 5, of the outer shell or layer of the heater. Thus, some current is diverted from the ferromagnetic material and the rate of heating to Curie temperature is reduced. Slots 36, 37 and 38 may divert enough current from the ferromagnetic layer so that the heater never achieves Curie temperature, thus establishing a cool or more precisely a cooler zone than adjacent the slot 34.

Slots 40 and 42 define a central current flow region 44 which may be employed to further reduce current flow adjacent the ferromagnetic layer. As an alternative, however, ferromagnetic material may be disposed under the region 44 so that heating occurs in this region.

Figure 6:
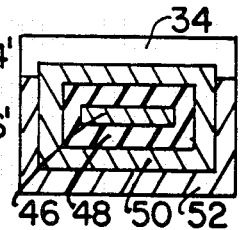
FIG. 6 is a view in cross-section taken along section line 6—6 of FIG. 5.

In a further alternative arrangement, ferromagnetic material may encircle the heater under the outer layer whereby heating occurs at all locations except where there are slots. Such an arrangement is illustrated in FIG. 6 of the accompanying drawings, a figure taken along section line 6—6 of FIG. 5. A return conductor 46 is surrounded by insulation 48, in turn surrounded by a ferromagnetic layer 50 with an outer conductive shell 52. As indicated above, heating occurs at all locations except where there are slots.

It should be noted that in all of the heaters illustrated thus far, the current return conductor and the outer conductor, ferromagnetic layer or copper substrate, depending on the type of heater employed, are connected in series with one another across the current source. This is usually accomplished by applying the current to the center and other conductors at one end of the device and connecting these conductors together at the other end of the device.

Figure 7:
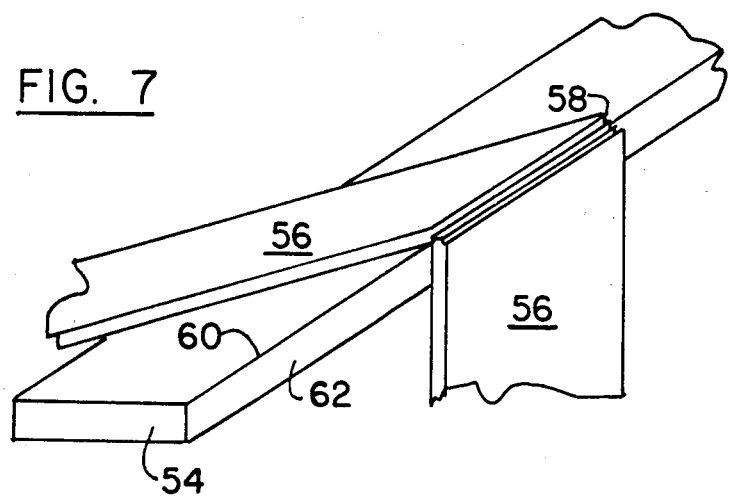
FIG. 7 is a perspective view illustrating the use of a slot to enhance bendability of a heater in accordance with the present invention.

The slots provided according to the present invention may also be employed to permit a heater to bend about a sharp corner. Referring specifically to FIG. 7 of the accompanying drawings, there is illustrated a rectangular workpiece 54 that is to be heated by a heater 56. The heater 56 is provided with a slot 58 so that the heater may come across the top of the workpiece 54, bent over the upper right corner 60 of piece 54 and maintain contact with vertical surfaces 62, all as illustrated in FIG. 7. Thus, the heater is rendered readily bendable by using a simple slot while maintaining the rest of it relatively rigid so that good contact is maintained between heater and workpiece at all locations.

Figure 8:
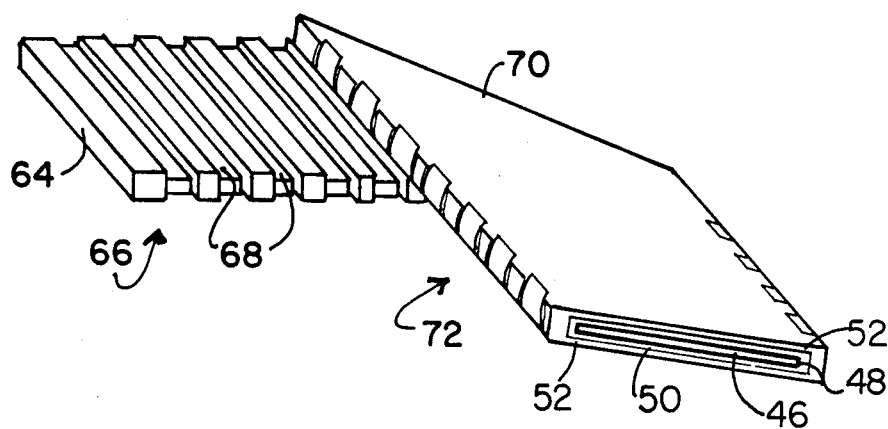
FIG. 8 is a view in perspective of another embodiment of the present invention.

Referring now specifically to FIG. 8 of the accompanying drawings, there is illustrated a heater employing a 45° slot to permit right angle folding of a strap.

A region 64 of strap 66 is slotted on its upper surface as at 68 to provide heating along the lower surface. The lower surface is provided with a 45° slot that permits a right angle fold 70 of the strap. The upper and lower surface of the folded length 72 of the strap may be slotted to permit heating of the lower or upper surface, the strap being flexible enough to permit the lower surface length 72 to contact the same surface as region 64. Alternatively, the region 72 or even region 64 may be unslotted to provide heating along all surfaces of the heater with, of course, appropriately located ferromagnetic material.

The slots in region 72 could be arrayed along the upper rather than the lower surface of the strip, as viewed in FIG. 8, so that heating remains along the upper surface.

It should be apparent that the fold 70 could be other than 90° by changing the slot on the lower surface from 45° to some other desired angle. A slot of 30° to the longitudinal axis produces a fold of 60° while a slot of 60° will produce a fold of 120°.

As to the slots 68, they have been shown in all figures as perpendicular to the longitudinal axis of the strap. These slots may also be angled to produce a helix rather than an annulus. The angle may be chosen to produce a desired pitch when the strap is to be wrapped around a pipe, for instance, to keep it from freezing. The pitch desirably prevents overlap of adjacent turns of the helix and in fact be great enough to define a permissible spacing between turns as determined by the internal temperature required in the pipe and the ambient temperature.

Once given the above disclosure, many other features, modifications and improvements will become apparent to the skilled artisan. Such other modifications, features and improvements are, therefore, considered a part of this invention, the scope of which is to be determined by the following claims.

I claim:

1. A Curie temperature autoregulating heater comprising an outer conductor having a plurality of surfaces and at least one slot in a specified region of at least one of said surfaces, which slot is less in length than said surfaces and is positioned to interrupt current flow through at least a length of said outer conductor, ferromagnetic material disposed adjacent and in electrical and thermal contact with a surface of said outer conductor other than said region in said one of said surfaces, a return conduductor electrically connected in series with said ferromagnetic material.

2. A Curie temperature autoregulating heater as defined in claim 1 wherein said outer conductor is a hollow elongated structure, said ferromagnetic material being located interiorly of said hollow structure.

3. A Curie temperature autoregulating heater as defined in claim 1 or claim 2 wherein said one surface of said outer conductor has a plurality of spaced, generally transverse slots.

4. A Curie temperature autoregulating heater as defined in claim 3 wherein said plurality of slots are arranged along a majority of the elongated length of said hollow structure.

5. A Curie temperature autoregulating heater as defined in claim 4 wherein said elongated hollow structure is rectangular in cross-section and some of said slots extend across at least three of the sides of said hollow structure, and said ferromagnetic material is disposed adjacent the fourth side of said hollow structure.

6. A Curie temperature autoregulating heater as defined in claim 1 wherein said ferromagnetic material comprises a plurality of distinct lengths of ferromagnetic materials various of which have different Curie temperatures.

7. A Curie temperature autoregulating heater as defined in claim 2 wherein said ferromagnetic material comprises a plurality of distinct lengths of ferromagnetic materials various of which have different Curie temperatures.

8. A Curie temperature autoregulating heater as defined in claim 2 wherein said one surface has a plurality of slots having different widths transverse to the elongated dimension of said hollow structure.

9. A Curie temperature autoregulating heater as defined in claim 1 or claim 2 further comprising means for defining zones of different rates of heating of said heater, said means including slots in the surfaces of said hollow structure to define specific current densities in different regions of said ferromagnetic material.

10. A Curie temperature autoregulating heater as defined in claim 9 further comprising means controlling the electrical resistance of said heater, said means including slots formed in various of said surfaces of said hollow structure.

11. A Curie temperature autoregulating heater as defined in claim 1 or claim 2 further comprising means controlling the electrical resistance of said heater, said means including slots formed in various of said surfaces of said hollow structure.

12. A Curie temperature autoregulating heater as defined in claim 1 wherein said ferromagnetic material is at least five skin depths thick above Curie temperature at the operating frequency of current applied thereto.

13. A Curie temperature autoregulating heater as defined in claim 1 wherein said ferromagnetic material is less than two skin depths.

14. A Curie temperature autoregulating heater as defined in claim 13 further comprising a layer of conductive material lying between said ferromagnetic material and said outer conductor.

15. A Curie temperature autoregulating heater as defined in claim 4 wherein said slots are equally spaced along said elongated lengths.

* * * * *